United States Patent [19]
Enander

[11] Patent Number: 5,890,359
[45] Date of Patent: Apr. 6, 1999

[54] METHOD AND A DEVICE FOR REDUCING $NO_x$ EMISSIONS FROM A DIESEL ENGINE

[75] Inventor: Niklas Enander, Göteborg, Sweden

[73] Assignee: Volvo Lastvagnar AB, Sweden

[21] Appl. No.: 768,304

[22] Filed: Dec. 17, 1996

[51] Int. Cl.[6] ................................................ F01N 3/00
[52] U.S. Cl. ...................... 60/274; 60/278; 123/569
[58] Field of Search ................... 60/274, 278; 123/569

[56] References Cited

U.S. PATENT DOCUMENTS

| | | | |
|---|---|---|---|
| 4,075,994 | 2/1978 | Mayer | 60/278 |
| 4,462,379 | 7/1984 | Tsuge | 60/278 |
| 4,602,606 | 7/1986 | Kawagoe et al. | 123/569 |
| 5,632,144 | 5/1997 | Isobe | 60/278 |

*Primary Examiner*—Thomas E. Denion
*Attorney, Agent, or Firm*—Lerner, David, Littenberg, Krumholz & Mentlik

[57] ABSTRACT

A method and a device for reducing $NO_x$ emissions from a diesel engine is disclosed. The engine has an inlet system for introducing air into the engine, an exhaust system for exhausting gases from the engine and a branch conduit connecting the exhaust system with the inlet system to permit recirculation of a portion of exhaust gases. A flow control valve is provided which is associated with the branch conduit for regulating the portion of exhaust gases flowing through the branch conduit. The engine further includes control means responsive to particular engine parameters. The control means is employed to effect regulation of the flow control valve based on values of the engine parameters. The control means determine when the engine is running below a predetermined maximum speed, and opens the flow control valve only when the engine is running below the predetermined maximum speed.

11 Claims, 3 Drawing Sheets

METHOD AND A DEVICE FOR REDUCING NO$_x$ EMISSIONS FROM A DIESEL ENGINE

TECHNICAL FIELD

The present invention relates to a method and a device for reducing NO$_x$ emissions from a diesel engine.

BACKGROUND OF THE INVENTION

It is known to equip engines with exhaust gas recirculation (EGR) systems. Such systems generally comprise a branch conduit between the inlet manifold and the exhaust pipe of an engine. A valve is placed in the branch conduit and is adjustable to recirculate a fraction of the exhaust gases generated by the engine. Thus, a smaller portion of the exhaust gases is taken from the exhaust and mixed with the intake gases. In order to increase the density of the intake charge, the recirculated gases are normally passed through an intercooler in the branch conduit, thereby lowering the temperature of the intake charge.

The above-described systems are primarily used to reduce harmful exhaust emissions, i.e. nitrous oxides (NO$_x$), mainly for automobile engines. Due to the introduction of cooled recirculated exhaust gas, the peak temperature in the combustion chamber is lowered during the combustion phase, thus limiting the formation of NO$_x$. Normally, up to between about 5 percent and 20 percent of the exhaust gas volume is recycled. The EGR system is traditionally shut off when the engine load is low, e.g. during idling, to lower the fuel consumption and, in the case of petrol engines, to achieve a more even running of the engine. This also serves to prevent fouling of the valves and EGR system.

It is also known to utilise exhaust brakes in diesel engined vehicles, see U.S. Pat. No. 5,193,657. Such exhaust brakes are activated when the engine speed has to be lowered rapidly or when the engine-braking efficiency has to be increased, for instance when the driver of the vehicle presses the brake pedal. More efficient engine braking is achieved because the engine load is increased.

Increased exhaust pressure, and thereby increased load on the engine, is often utilized by truck drivers when their vehicles are stationary for relatively long periods in cold climates. Due to the increased load on the engine, more fuel is burnt and therefore the engine temperature is increased. The heat thus generated is then used for heating the interior of the vehicle cab. The increased load on the engine does, however, increase the fuel consumption of the engine.

From the documents JP-A-7180572 and WO-A-9310339 it is known to use an exhaust pressure governor (EPG) to adjust the exhaust back pressure to vary the exhaust flow depending upon the operating state of a spark-ignition engine. This is said to result in improved combustion efficiency and a raised catalytic converter temperature, with a resulting decrease in NO$_x$ emissions through the exhaust.

From DE-A-3339053 it is known to briefly completely shut off the exhaust when the brakes are applied, when starting the engine or when the engine is idling. According to said document, this results in lowered emission of unburnt white fumes when cold starting and lowered emission of blue smoke when idling.

SUMMARY OF THE INVENTION

It is therefore an object of the present invention to provide a method and a device for efficiently reducing NO$_x$ emissions from a diesel engine, such as those used in trucks and other heavy vehicles, during idling of the engine. Idling, for this purpose, is defined as the mode of running the engine at low engine speeds, typically 500–600 rpm, during circumstances when low air utilization prevails. In this respect, it is to be noted that a diesel engine always operates with a surplus of air, otherwise excess soot formation arises. Typically the maximum value of air utilization is about 70%. When the engine runs at tickover under no load, the air utilization is about 8 to 10%. For the purposes of the present invention, low air utilization signifies air utilization less than about 40%.

A further object of the invention is to provide a method and a device for economically generating sufficient engine heat, during extended idling periods, to heat the vehicle cab or interior.

It is a further object of the invention to reduce NO$_x$ emissions during idling when cold-starting a diesel engine.

These and other objects which will be apparent to those skilled in the art are achieved in accordance with the present invention by a method for reducing NO$_x$ emissions from a diesel engine during idling, said engine comprising an inlet system for introducing air into the engine;
an exhaust system for exhausting gases from the engine;
a branch conduit connecting said exhaust system with said inlet system to permit recirculation of a portion of exhaust gases;
a flow control valve associated with said branch conduit for regulating the portion of exhaust gases flowing through said branch conduit; and
control means responsive to particular engine parameters, said control means effecting regulation of said flow control valve based on values of said engine parameters;
said method comprising the steps of:
employing the control means to detect when the engine is running below a predetermined maximum speed, and
opening said flow control valve only when the control means detects that the engine is running below said predetermined maximum speed.

Since, in the method according to the present invention, hot exhaust gases are recirculated into the engine when the engine is idling, the average temperature in the combustion chamber is higher compared to when no recirculation takes place. This increase in temperature results in a decrease in the level of soot emissions. Since the average combustion temperature is higher, more heat is generated by the engine to heat the vehicle cab without having to resort to increased engine loads and/or speeds. Despite the higher average temperature, the peak combustion temperature is lower, resulting in lower NO$_x$, emissions. The NO$_x$, emissions are further reduced due to the dilution of intake air by the recirculated exhaust gases.

The present invention also provides a method for reducing NO$_x$ emissions during idling of a diesel engine when said diesel engine is started from cold, said diesel engine comprising an inlet system for introducing air into the engine;
an exhaust system for exhausting gases from the engine;
a branch conduit connecting said exhaust system with said inlet system to permit recirculation of a portion of exhaust gases;
a flow control valve associated with said branch conduit for regulating the portion of exhaust gases flowing through said branch conduit;
an exhaust pressure governor located in said exhaust system downstream of said branch conduit; and control means responsive to particular engine parameters, said control means effecting regulation of said flow control valve and said exhaust pressure governor based on values of said engine parameters; said method comprising the steps of:

starting the engine so that the engine reaches an operating temperature;

monitoring said operating temperature;

closing said exhaust pressure governor and said flow control valve when said operating temperature is below a first predetermined value;

opening said exhaust pressure governor and said flow control valve when said temperature reaches a second predetermined value; and closing said flow control valve if said temperature exceeds a predetermined maximum value.

The present invention further provides a device for reducing $NO_x$ emissions from a diesel engine during idling, said engine comprising an inlet system for introducing air into the engine;

an exhaust system for exhausting gases from the engine;

a branch conduit connecting said exhaust system with said inlet system to permit recirculation of a portion of exhaust gases;

a flow control valve associated with said branch conduit for regulating the portion of exhaust gases flowing through said branch conduit; and control means responsive to particular engine parameters, said control means effecting regulation of said flow control valve based on values of said engine parameters;

wherein said control means is arranged to open said flow control valve only when said control means detects that the engine is running below said predetermined maximum speed.

BRIEF DESCRIPTION OF THE DRAWINGS

The invention will be described in greater detail in the following by way of example only and with reference to the attached drawings, in which.

DETAILED DESCRIPTION OF PREFERRED EMBODIMENTS

Figure 1:
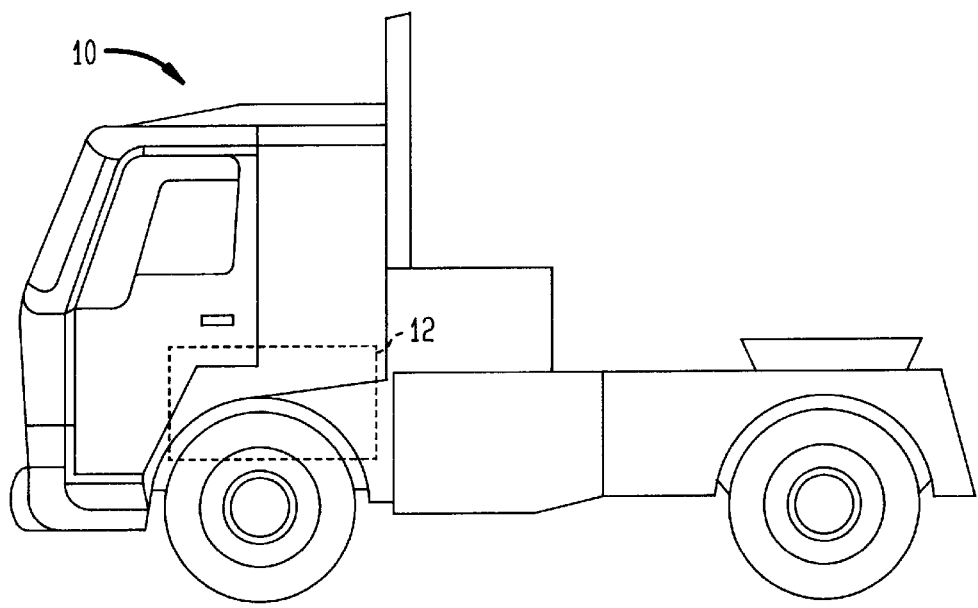
FIG. 1 is a schematic elevational view of a vehicle in the form of a truck equipped with a diesel engine incorporating the device according to the present invention.

In FIG. 1, reference numeral 10 generally denotes a vehicle, for example a truck, having a diesel engine 12 which may be equipped with a device for reducing $NO_x$ emissions in accordance with the present invention.

Figure 2:
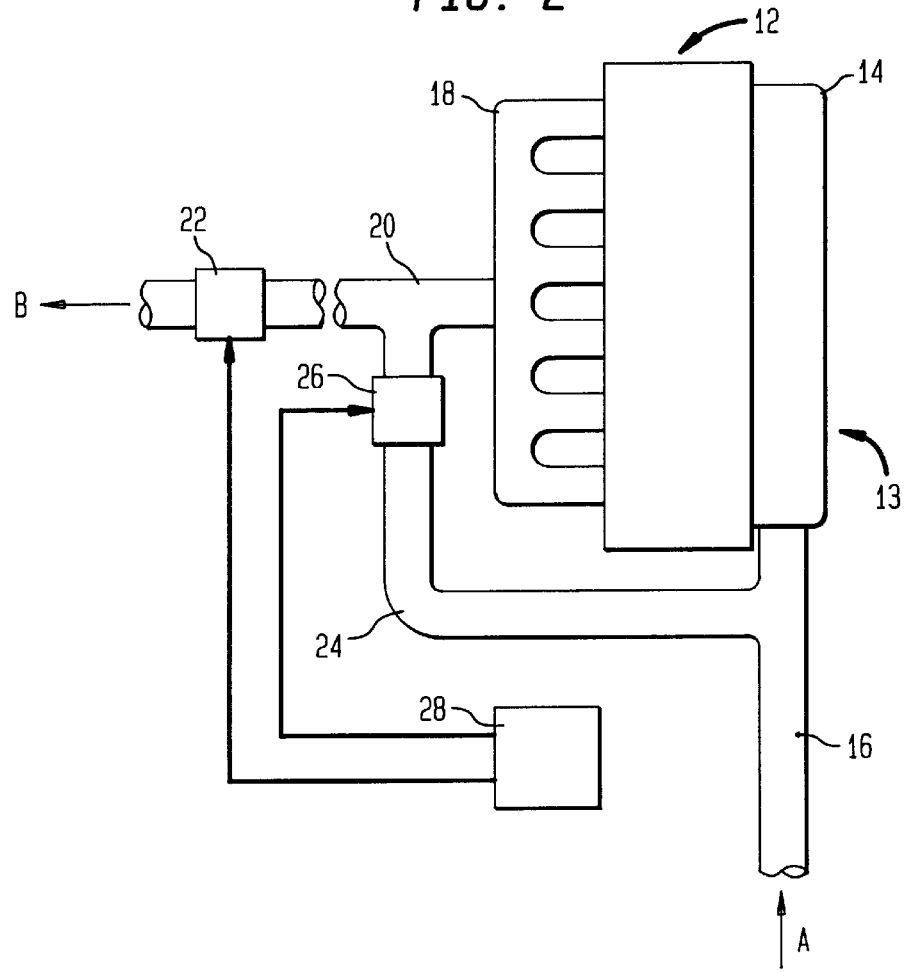
FIG. 2 is a schematic plan view of one embodiment of the device according to the invention.

The diesel engine 12 is shown schematically in greater detail in FIG. 2. The engine 12 comprises an inlet system 13 including an inlet manifold 14 which feeds air to a number of cylinders in a cylinder block 15. Air represented by arrow A is drawn through a not shown air filter along an inlet conduit 16 of the inlet system, which conduit communicates with the inlet manifold 14 . The air is mixed either in the inlet manifold or the cylinders in any conventional manner with fuel. Combustion of the fuel takes place in combustion chambers within the cylinders and gases generated by the combustion are exhausted from the cylinders via an exhaust system comprising an exhaust manifold 18 communicating with an exhaust pipe 20 through which exhaust gases represented by arrow B are exhausted to atmosphere. In a manner which is known per se, the exhaust pipe 20 may be provided with an exhaust pressure governor 22.

In order to effect exhaust gas recirculation, the engine 12 is further provided with a branch conduit 24 which extends from the exhaust pipe 20 to the inlet conduit 16. Naturally, the branch conduit may instead be arranged to connect the exhaust manifold 18 to either the inlet conduit 16 or the inlet manifold 14. Important is only that the branch conduit 24 be capable of transporting a portion of the exhaust gases to be mixed with the air entering the engine via the inlet manifold 14.

The branch conduit 24 is provided with a flow control valve 26. The flow control valve 26 serves to vary on demand the open cross-sectional area of the branch conduit 24. In this manner, the quantity of exhaust gases passing along the branch conduit can be adjusted. The location of the flow control valve 26 along the branch conduit 24 is not critical, though it may be advantageous to position the flow control valve as close as possible to the inlet manifold 14 to thereby distance the valve as much as possible from the heat emitted from the exhaust system.

In accordance with the present invention, the flow control valve 26 is arranged to be operated by control means 28. The control means 28 responds to parameters relating to operating conditions of the engine. Such parameters may include for example the engine speed V, the temperature $T_{coolant}$ of engine coolant, the temperature $T_{inlet}$ in the inlet manifold 14 and the prevailing pressure P in the inlet manifold. In a manner which will be explained below, the control means 28 may also influence the exhaust pressure governor 22.

In order to reduce $NO_x$ emissions from the diesel engine 12 during idling of the engine, i.e. when the engine speed V is below a preset maximum value $V_{max}$, for example 800 rpm, and the air utilization is less than about 40%, the device according to the invention operates in the following manner.

Firstly, the control means 28 checks that the engine speed is below a preset maximum value $V_{max}$. Once it has been ascertained that the engine speed is below this value, it is preferable that the control means determines whether the engine is under load. This can be achieved by sensing the pressure P in the inlet manifold since the pressure in the inlet manifold increases inversely with respect to load. Provided that the engine is not under undue load, i.e. the air utilization is less than about 40%, the control means 28 opens the flow control valve 26 to allow a portion of the exhaust gases to be recirculated through the engine.

Figure 3:
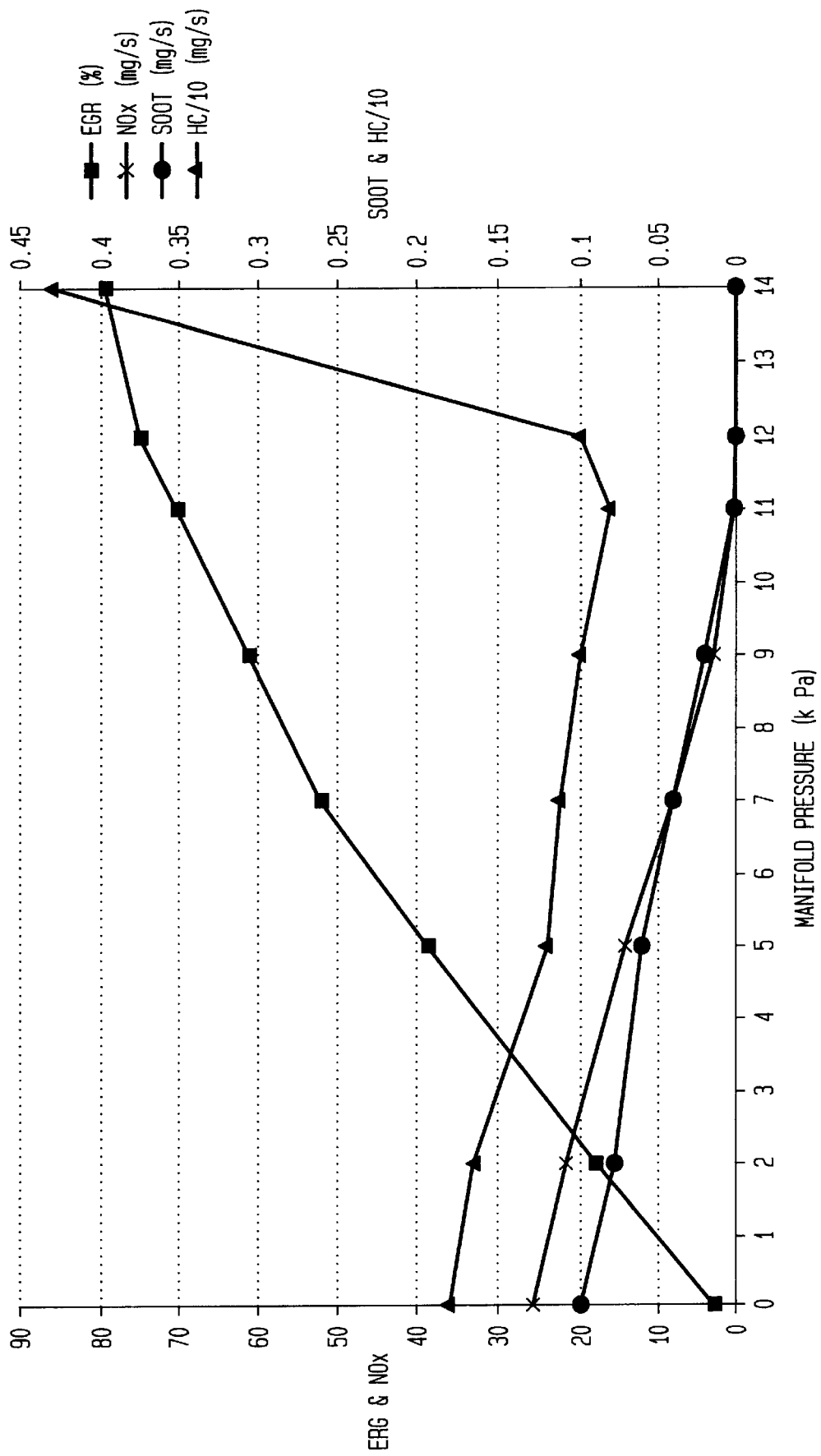
FIG. 3 is a diagram showing different emissions as a function of the EGR percentage and exhaust manifold pressure for a diesel engine equipped with the device according to the present invention.

Initial trials suggest that up to 50% recirculation of the exhaust gases can be achieved at idle by opening the flow control valve 26. With reference to FIG. 3, it can be seen that in tests performed on a Volvo diesel engine, type D12A equipped with the device according to the present invention, a 50% recirculation of the exhaust gases at an operating pressure of 6.5 kPa results in a reduction of $NO_x$ emissions from about 26 mg/s with the flow control valve 26 shut to about 10 mg/s with the flow control valve fully open. In order to obtain a greater percentage of exhaust gas recirculation, and to thereby obtain an even greater reduction of $NO_x$ emissions, it is necessary to further increase the back pressure in the exhaust system.

Thus, in a preferred embodiment of the method according to the present invention, the control means 28 is arranged to operate the exhaust pressure governor 22 to restrict the exhaust pipe 20. In this manner, up to 80% exhaust gas recirculation can be achieved. Advantageously, the control means 28 monitors the temperature of the engine, for example by sensing the temperature of the engine coolant. If the temperature of the engine reaches a predetermined maximum value, the exhaust pressure governor 22 is opened to thereby reduce the back pressure in the exhaust system.

With reference to FIG. 3, it will be appreciated that significant reductions of $NO_x$ emissions are achievable with, for example, just 10% exhaust gas recirculation. More specifically, FIG. 3 is a graphical representation of the variation of certain emissions with increased exhaust gas recirculation. The percentage of exhaust gas recirculation (EGR) is depicted by the curve with filled squares, hydrocarbon emissions (HC) are depicted by the curve with filled triangles, nitrous oxide ($NO_x$) emissions are depicted by the curve with crosses and soot emissions are shown by the curve with filled circles. Emissions decrease with increasing EGR percentage, except for the hydrocarbon emissions, which first decreases then increases at EGR percentages around 70%. From the diagram it is evident that an EGR percentage of at least about 10% up to about 80% is advantageous, more preferably between about 25% and about 75%, and most preferably between about 40% and about 70%. Hydrocarbon emission increases above about 70% recirculation because insufficient air is available in the combustion chamber for complete combustion of the charge to take place.

The device according to the present invention can also be employed to obtain a quicker warming up of the engine under cold starting. Thus, in a further method according to the present invention, the engine is started from cold. The control means 28 detects the temperature of the engine and when this temperature is below a first predetermined value, both the exhaust pressure governor 22 and the flow control valve 26 are kept closed. In this manner, an increased load is placed on the engine so that more fuel is burnt and the engine heats up rapidly. As the temperature increases so that it reaches a second predetermined value, the flow control valve 26 is opened and, optionally, the exhaust pressure governor 22 can be opened. In this manner, hot exhaust gases are introduced into the inlet manifold, thereby contributing to an increase in the temperature of the engine. Should the temperature of the engine exceed a predetermined maximum value, the control means 28 ensures that the flow control valve 26 is gradually closed until the temperature drops below said predetermined maximum value. Should the engine speed increase above the preset maximum value $V_{max}$, the control means 28 ensures that the flow control valve 26 is closed.

Figure 4:
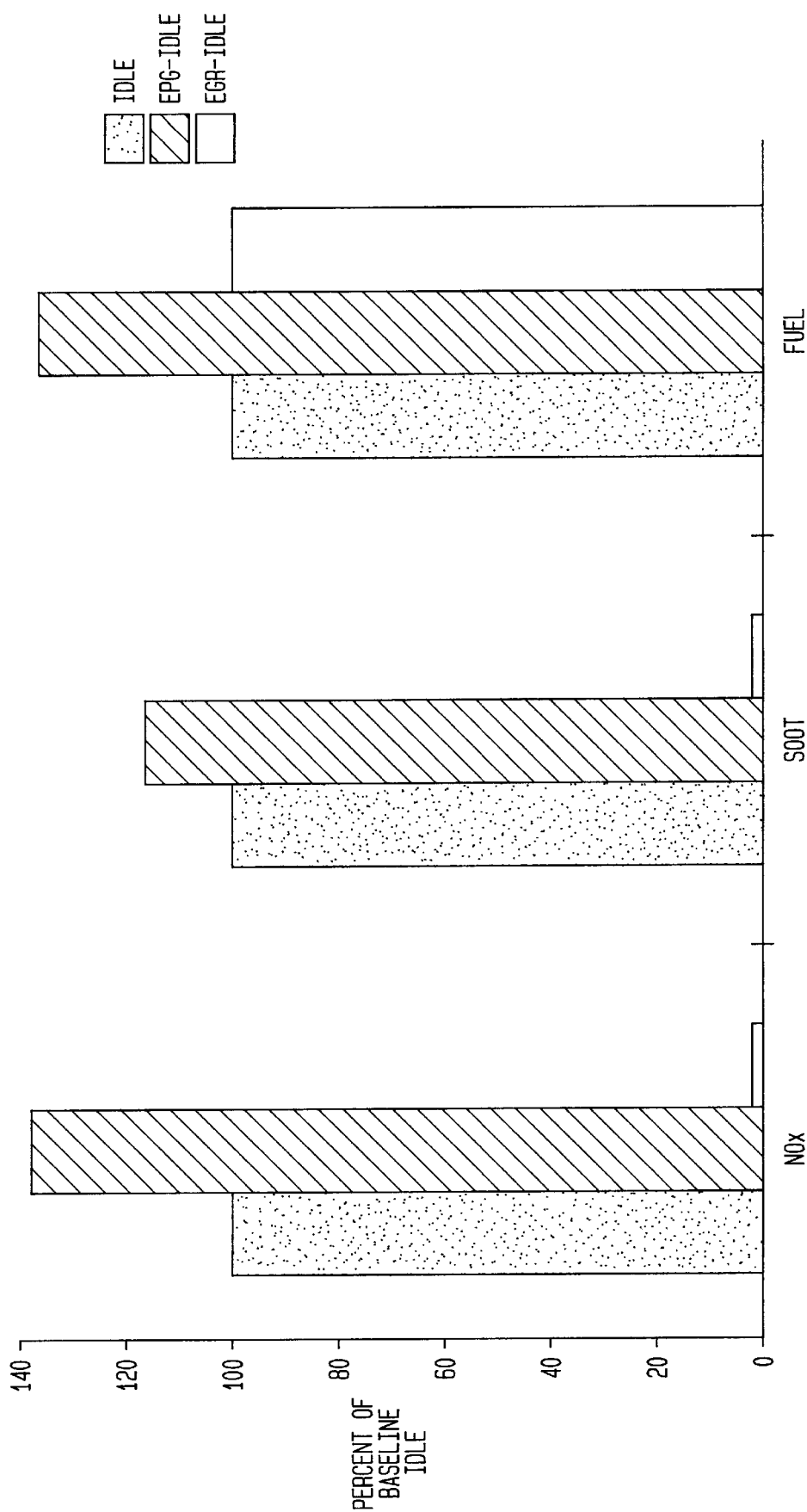
FIG. 4 is a diagram showing emissions as a function of the percent baseline idle for a diesel engine equipped with the device according to the present invention.

In FIG. 4 there is shown a bar graph comparison of different emission amounts during three different types of idling conditions, namely normal idle (left bar), EPG idle (middle bar) and EGR idle (right bar). EPG, in this context, stands for exhaust pressure governing, and is traditionally used when increased engine warming is required. As is evident from the diagram, an EGR idle system according to the invention gives much lower emissions as regards $NO_x$ and soot, whilst not requiring any more fuel than during normal idle.

The present invention is not restricted to the embodiments described above and illustrated by way of example in the drawings, but may be varied within the scope of the appended claims. For example, the embodiment illustrated in FIG. 2 shows an in-line engine, i.e. the cylinders are in one line. For an engine with a V-construction, where the cylinders are in two banks with a certain angle between the banks, it might be necessary to have two sets of devices according to the invention, one for each cylinder bank. Naturally, the invention can also be implemented on engines equipped with a turbocharger arrangement. Instead of utilizing an exhaust pressure governor or some other pumping means, it is conceivable that the natural pressure differential between the exhaust side and the inlet side of the engine be used by utilizing a high cross-sectional area branch pipe for the flow control valve.

What is claimed is:

1. A method for reducing $NO_x$ emissions from a diesel engine during idling, said engine comprising
   an inlet system for introducing air into the engine;
   an exhaust system for exhausting gases from the engine;
   a branch conduit connecting said exhaust system with said inlet system to permit recirculation of a portion of exhaust gases;
   a flow control valve associated with said branch conduit for regulating the portion of exhaust gases flowing through said branch conduit; and
   control means responsive to particular engine parameters, said control means effecting regulation of said flow control valve based on values of said engine parameters; said method comprising the steps of:
   employing the control means to detect when the engine is running below a predetermined maximum speed, and
   opening said flow control valve only when the control means detects that the engine is running below said predetermined maximum speed.

2. The method as claimed in claim 1, whereby said control means determines what load the engine is placed under and permits said flow control valve to be opened only if said load is below a predetermined value.

3. The method as claimed in claim 1 or claim 2, whereby said control means detects a temperature associated with operating conditions of the engine and, if said temperature is below a first value, said control means causes activation of an exhaust pressure governor in said exhaust system to thereby increase back pressure in said exhaust system.

4. The method as claimed in claim 1, whereby said portion of recirculated exhaust gas is between about 10% and about 80% of the total exhaust gas volume.

5. The method as claimed in claim 1, whereby said portion of recirculated exhaust gas is between about 25% and about 75% of the total exhaust gas volume.

6. The method, as claimed in claim 1, whereby said portion of recirculated exhaust gas is between about 40% and about 70% of the total exhaust gas volume.

7. The method as claimed in claim 1, whereby said predetermined maximum engine speed corresponds to a speed between 100 and 500 rpm above the idling speed of the engine.

8. A method for reducing $NO_x$ emissions during idling of a diesel engine when said diesel engine is started from cold, said diesel engine comprising
   an inlet system for introducing air into the engine;
   an exhaust system for exhausting gases from the engine;
   a branch conduit connecting said exhaust system with said inlet system to permit recirculation of a portion of exhaust gases;

a flow control valve associated with said branch conduit for regulating the portion of exhaust gases flowing through said branch conduit;

an exhaust pressure governor located in said exhaust system downstream of said branch conduit; and control means responsive to particular engine parameters, said control means effecting regulation of said flow control valve and said exhaust pressure governor based on values of said engine parameters; said method comprising the steps of:

starting the engine so that the engine reaches an operating temperature;

monitoring said operating temperature;

closing said exhaust pressure governor and said flow control valve when said operating temperature is below a first predetermined value;

opening said exhaust pressure governor and said flow control valve when said temperature reaches a second predetermined value; and closing said flow control valve if said temperature exceeds a predetermined maximum value.

9. A device for reducing $NO_x$ emissions from a diesel engine during idling, said engine comprising an inlet system for introducing air into the engine;

an exhaust system for exhausting gases from the engine;

a branch conduit connecting said exhaust system with said inlet system to permit recirculation of a portion of exhaust gases;

a flow control valve associated with said branch conduit for regulating the portion of exhaust gases flowing through said branch conduit; and control means responsive to particular engine parameters, said control means effecting regulation of said flow control valve based on values of said engine parameters;

wherein said control means is arranged to open said flow control valve only when said control means detects that the engine is running below a predetermined maximum speed.

10. The device as claimed in claim 9, wherein said device further comprises an exhaust pressure governor in said exhaust system for selectively increasing back pressure in said exhaust system.

11. A vehicle provided with a device for reducing $NO_x$ emissions from a diesel engine during idling, said engine comprising an inlet system for introducing air into the engine;

an exhaust system for exhausting gases from the engine;

a branch conduit connecting said exhaust system with said inlet system to permit recirculation of a portion of exhaust gases;

a flow control valve associated with said branch conduit for regulating the portion of exhaust gases flowing through said branch conduit; and control means responsive to particular engine parameters, said control means effecting regulation of said flow control valve based on values of said engine parameters;

wherein said control means is arranged to open said flow control valve only when said control means detects that the engine is running below a predetermined maximum speed.

* * * * *